(12) United States Patent
Jan

(10) Patent No.: US 9,918,580 B2
(45) Date of Patent: Mar. 20, 2018

(54) FOOD DISPENSING SYSTEM AND METHOD

(71) Applicant: Rifat Jan, Maidenhead (GB)

(72) Inventor: Rifat Jan, Maidenhead (GB)

( * ) Notice: Subject to any disclaimer, the term of this patent is extended or adjusted under 35 U.S.C. 154(b) by 0 days.

(21) Appl. No.: 14/417,149

(22) PCT Filed: Jul. 15, 2013

(86) PCT No.: PCT/GB2013/051877
§ 371 (c)(1),
(2) Date: Jan. 24, 2015

(87) PCT Pub. No.: WO2014/016565
PCT Pub. Date: Jan. 30, 2014

(65) Prior Publication Data
US 2015/0201786 A1    Jul. 23, 2015

(30) Foreign Application Priority Data

Jul. 24, 2012  (GB) .................................... 1213120.7
Nov. 2, 2012   (GB) .................................... 1219793.5

(51) Int. Cl.
*A47J 19/04*   (2006.01)
*A47J 47/01*   (2006.01)
*A47J 43/28*   (2006.01)
*B65D 75/58*   (2006.01)
*B65B 1/04*    (2006.01)

(52) U.S. Cl.
CPC ............. *A47J 19/04* (2013.01); *A47J 43/284* (2013.01); *A47J 47/01* (2013.01); *B65B 1/04* (2013.01); *B65D 75/5883* (2013.01)

(58) Field of Classification Search
CPC .......... A47J 19/04; A47J 43/284; A47J 47/01; B65B 1/18; B65D 75/5883
USPC .... 141/10, 25–27, 71, 73, 80, 114; 222/386, 222/387
See application file for complete search history.

(56) References Cited

U.S. PATENT DOCUMENTS 3,492,876 A * 2/1970 Siggaard-Andersen B01L 3/0206
                                                   141/27
3,682,356 A   8/1972  Karle
4,493,349 A   1/1985  Pomponio, Sr.
4,796,785 A   1/1989  Merritt
5,006,118 A * 4/1991  Yule ....................... A61J 1/067
                                                   128/DIG. 24
(Continued)

FOREIGN PATENT DOCUMENTS

DE    EP 0134093 B1 * 2/1988 .............. A47J 19/06
EP        0134093        3/1985
(Continued)

OTHER PUBLICATIONS

'Fresh Squeezed' Infantino Blog, Jul. 13 2012, http://infantinoblog.com/2012/07/13/fresh-squeezed/#more-743.
(Continued)

*Primary Examiner* — Timothy L Maust

(57) ABSTRACT

Paste food dispensation devices and tillable, sealable sachets or pouches for food use are known in the art. The present invention provides a food dispensing system that enables food to be mashed within a hopper, and then to be dispensed into a pouch by way of a plunger formed from a masher with a cover on the head of the masher.

15 Claims, 4 Drawing Sheets

(56) References Cited

U.S. PATENT DOCUMENTS

| | | | | |
|---|---|---|---|---|
| 5,397,313 | A * | 3/1995 | Gross | A61M 5/31513 604/218 |
| 5,697,918 | A * | 12/1997 | Fischer | A61C 5/062 433/90 |
| 5,951,160 | A * | 9/1999 | Ronk | B01F 13/002 366/130 |
| 6,432,089 | B1 * | 8/2002 | Kakimi | A61M 5/14546 604/218 |
| 6,626,870 | B1 * | 9/2003 | Yarborough | A61M 5/31511 604/187 |
| 9,289,557 | B2 * | 3/2016 | Ivosevic | A61M 5/31513 |
| 2008/0105328 | A1 * | 5/2008 | Desmond | A45C 3/00 141/2 |
| 2008/0300550 | A1 * | 12/2008 | Schiller | A61M 5/31511 604/220 |
| 2011/0290826 | A1 | 12/2011 | Harris | |

FOREIGN PATENT DOCUMENTS

| | | |
|---|---|---|
| EP | 0134093 A1 | 3/1985 |
| GB | 2426234 | 11/2006 |
| GB | 2426234 A | 11/2006 |
| GB | 2498422 | 7/2013 |

OTHER PUBLICATIONS

'Fresh Squeezed' Youtube video, username: InfantinoMomsRule, Jul. 20, 2012, http://www.youtube.com/watch?v=d2n_OBgkPko&feature=plcp.

A InfantinoMomsRule Facebook wall post dated Jun. 28, 2012, particularly associated photo: http://www.facebook.com/photo.phpfbid=463954303617144&set=a.139166829429228.24955.125340400811871&type=1&relevant_count=1, http://www.facebook.com/InfantinoMomsRule.

Infantino Squeeze Station Demo Video on this webpage: http://www.infantino.com/product.cfm?product_id=1446#.

'www.pouched.com.au Filling Food Pouches' Youtube Video, Feb. 24, 2012, http://www.youtube.com/watch?v=aHY4aoa5US8.

PCT International Search Report, dated Oct. 23, 2013.

Infantino: "Fresh Squeezed", Jul. 18, 2012, XP054975221, Retrieved from the Internet: URL: http://youtu.be/SMS_BLJfbyo [retrieved on Sep. 12, 2013].

* cited by examiner

FOOD DISPENSING SYSTEM AND METHOD

BACKGROUND OF THE INVENTION

The present invention relates generally to a food dispensing system and method, and finds particular, although not exclusive, utility in food paste dispensing.

Liquid food dispensation devices comprising a plunger are known in the art. For example, US2011132200 to Pollack discloses a liquid dispenser which also infuses the liquid with the flavour of a garnish. The device comprises a hopper with a tap comprising a valve and spout to regulate the delivery of the infused liquid. The screw on cap, which secures the liquid within the dispenser, will be attached to a plunger and permeable catch tray. The catch tray will hold the garnish without letting the garnish interfere with the tap.

Paste food dispensation devices are known in the art. For example, GB2304825 to Bransby discloses a dispenser for soft butter etc. comprising an outer moulding which is internally screw-threaded and of which a bottom end portion is seated in a base cup. An inner moulding forms a sleeve within the outer moulding, a bottom end of the sleeve being secured to a floor of the base cup. A plunger is accommodated within the sleeve, to act as a piston for dispensing butter from a collapsible container within the sleeve, the butter being discharged through an orifice in a top piece. Four lugs of the plunger project radially through axially-extending slots in the sleeve into engagement with the screw-threaded outer moulding. By rotating the outer moulding relative to the base cup, the plunger can be driven through the sleeve, rotation of the plunger relative to the base cup being prevented by the engagement of the plunger lugs in the slots of the sleeve.

Finable, sealable sachets or pouches for food use are known in the art. For example, GB2426234 to Harrison discloses a dispensing system comprising: a partially or completely collapsed container such as a flexible pouch, for containing an individual portion of a liquid food or beverage, wherein the container comprises an inlet and a seal that substantially seals the inlet; and a liquid dispensing mechanism adapted to release the seal on the inlet and to inject a liquid into the container through the inlet to produce said individual portion of a liquid food or beverage inside the container. GB2426234 also discloses a method of making a container holding an individual portion of a liquid food or beverage product, comprising the steps of: providing a partially or completely collapsed container having a substantially rigid, sealed inlet; clamping the container in a liquid dispensing mechanism; and injecting a liquid into the container through the inlet by means of the liquid dispensing mechanism. The container may have an X-cut septum beneath the seal to reseal the inlet after the injector tube of the liquid dispensing mechanism is removed. The dispensing mechanism preferably comprises at least a clamp adapted to grip the containers, an injector tube for insertion into the inlet of the container, and a mechanism to insert the injector tube into the inlet of the container when it is held in the clamp. Optionally the dispensing mechanism further comprises a pump and control therefore for injecting the said predetermined amount of liquid into the containers.

BRIEF SUMMARY OF THE INVENTION

It can be seen from the forgoing that it would be advantageous to have a food dispenser adapted for use with a particular sachet or pouch. It would be further advantageous to have such a dispenser and pouch system adapted for home use.

It is therefore an object of the present invention to provide a food dispenser and pouch system adapted for home use. It is a further object of the invention to provide a food dispenser adapted for use with a particular pouch, and to provide a pouch adapted for use with the dispenser.

According to a first aspect of the present invention, there is provided a masher, for mashing food to paste, the masher comprising: a handle, a head and a removable cover for the head such that, with the cover on the head, the masher may be used as a plunger within a hopper, such that paste food may be dispensed from the hopper via a spout in response to a plunging action of the masher within the hopper.

According to a second aspect of the present invention, there is provided a food dispensing system comprising: a hopper; a masher having a handle, a head and a removable cover for the head such that, with the cover on the head, the masher may be used as a plunger; and a spout; wherein said spout is adapted to cooperate with an opening of a food storage component, the food storage component having an opening with a nozzle at said opening.

Preferably, a food storage component is provided comprising a pouch having: a sachet with an opening; a nozzle at said opening; and a removable lid; wherein the spout of the dispenser is adapted to cooperate with said opening.

The system may comprise a latch wherein said latch may substantially maintain the position of said food storage component or said pouch with respect to said spout. The latch may fit behind a protrusion on said food storage component or said pouch to maintain the position. The latch may at least partially surround a protrusion on said food storage component or said pouch to maintain the position. The latch may comprise a manual latch. The latch may comprise an automatic latch.

The dispenser may further comprise at least one foot for providing stability. The foot may be configured to provide a gap substantially below the spout. The foot may be substantially C-shaped.

The system may further comprise a valve to prevent egression of food when the plunger is stationary.

The system may further comprise a cap for covering said spout.

The head may comprise at least one orifice. The head may comprise a multiplicity of orifices.

According to a third aspect of the invention, there is provided a method of dispensing food, comprising: providing the system of any preceding claim; placing food within the hopper; mashing the food within the hopper with the masher; covering the head of the masher with the cover to form a plunger; and plunging the plunger within the hopper to dispense food, via the spout, into a food storage component, the food storage component having an opening with a nozzle at said opening.

The present invention may have a fully openable lid for easy home filling, may be entirely mechanical for lowering costs, may be cleaned easily by passing hot water therethrough, may be small enough for home use, and may have a foot adapted not to interfere with manual filling and to remain clean, all of which adapt the design for home or childcare use rather than industrial use.

A further advantage of the invention is that the provision of a pouch adapted to cooperate with the dispenser enables easy engagement with convenient portion sizes and minimal waste or mess.

The terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "an embodiment" or "an aspect" means that a particular feature, structure or characteristic described in connection with the embodiment or aspect is included in at least one embodiment or aspect of the present invention. Thus, appearances of the phrases "in one embodiment", "in an embodiment", or "in an aspect" in various places throughout this specification are not necessarily all referring to the same embodiment or aspect, but may refer to different embodiments or aspects. Furthermore, the particular features, structures or characteristics of any embodiment or aspect of the invention may be combined in any suitable manner, as would be apparent to one of ordinary skill in the art from this disclosure, in one or more embodiments or aspects.

In the discussion of the invention, unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying between the more preferred and the less preferred of said alternatives, is itself preferred to said less preferred value and also to each value lying between said less preferred value and said intermediate value.

The use of the term "at least one" may, in some embodiments, mean only one.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

BRIEF DESCRIPTION OF THE SEVERAL VIEWS OF THE DRAWING

The invention can be better understood with reference to the following drawings, in which.

DETAILED DESCRIPTION OF THE INVENTION

Figure 1:
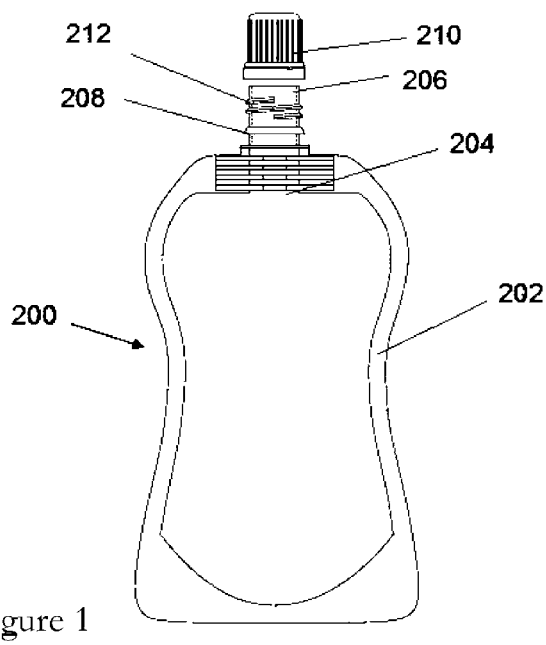
FIG. 1 shows a pouch of the food dispensing system of the present invention.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn to scale for illustrative purposes. The dimensions and the relative dimensions do not correspond to actual reductions to practice of the invention.

It should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in fewer than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some features included in other embodiments, combinations of features of different embodiments are meant to be within the scope of the invention, and form yet further embodiments, as will be understood by those skilled in the art. For example, in the following claims, any of the claimed embodiments can be used in any combination.

In the description provided herein, numerous specific details are set forth. However, it is understood that embodiments of the invention may be practised without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the underlying concept or technical teaching of the invention, the invention being limited only by the terms of the appended claims.

In the embodiment of the invention shown in FIGS. 1-9 a food dispensing system is disclosed comprising: a hopper 400; a plunger/masher 500; a plunger/masher handle 503; a plunger/masher head 501 and a removable cover 504 for the head 501; and a spout 404; wherein said spout is adapted to cooperate with an opening 206 of a food storage component 200, the food storage component 200 having an opening 206 with a nozzle 206 at said opening 206.

Specifically, a pouch 200 is shown in FIG. 1 to comprise: a sachet 202 having an opening 204; a nozzle 206 at said opening; and a removable lid 210; wherein the spout of the dispenser is adapted to cooperate with said opening. An advantage of providing a pouch with the invention is that the pouch can be designed to cooperate with the latch, and the latch designed to cooperate with the pouch. The pouch preferably comprises a protrusion 208 to cooperate with the latch. Furthermore the hopper can be designed to have a volume which is an exact multiple of volume the pouches, to minimise food waste.

The sachet 202 is preferably a flexible bag or packet which is airtight and watertight and has an internal volume when filled which is suitable for a meal for a baby or snack for a small child. Preferably, the volume is of the order of 100 ml and in particular may be 125 ml.

The opening is preferably positioned at the top of the sachet to facilitate filling, and enable the device to stand open when filled without food egress, although it may be in any location.

The nozzle is a device for holding the pouch open to facilitate sucking food from the pouch, and squeezing food from the pouch. The nozzle is therefore disposed in the opening and forms an airtight and watertight seal around the opening. The nozzle preferably comprises a substantially rigid cylinder although it may comprise other hollow shapes. The nozzle preferably has an outer screw thread 212 for engaging a lid, and at least one protrusion 208 for engaging a latch. The protrusion may be a separate feature as shown in the figure or may alternatively be incorporated into the screw thread. The nozzle may alternatively have other mechanisms for engaging a lid such as a snap-fit arrangement or the like as known in the art. The nozzle may also comprise indentations and/or protrusions for engaging with protrusions or indentations respectively on the latch to provide a locking or snap-fitting facility.

The nozzle 206 is also dimensioned to engage with the spout 404 to allow food to be pumped into the pouch. The nozzle may fit snugly inside the spout for this purpose, or may fit snugly around the outside of the spout. The nozzle may or may not comprise a seal for preventing leakage when engaged with the spout. One or both of the nozzle and spout may have tapered sides to allow for gradual engagement, or the sides of both may be parallel. In the preferred case, the spout and nozzle both comprise cylinders. This is advantageous because it is the simplest design, and the easiest to clean. Furthermore in the preferred case, the nozzle is sized to fit around the outside of the spout. This arrangement is advantageous since having the spout inside the nozzle during filling means that the food is already within the nozzle as it exits the spout, providing a lesser risk of leakage.

It is envisaged that the invention will be used to fill food storage components with food puree, for storage in portions suitable for feeding to babies. However, the device may be used for filling food storage components with other types of food puree, paste, liquid, or any consistency of food, or other paste-like or liquid substance. In particular, pureed fruit, vegetables, family meals, yoghurts and the like may be used therein.

The dispensing device may be provided independently or may be provided with one or more food storage components. The food storage component is preferably a pouch as described above, which pouches are preferably available with the dispenser or separately. However, the food storage component may also be any reusable or disposable container in which food can be stored, which has an opening able to cooperate with the spout of the dispenser to enable filling of the food storage component via the spout.

The dispenser may be provided independently of any food storage component. The food storage component is any container into which the food is dispensed from the dispenser. Food may be dispensed into any food storage component having an opening able to engage with the spout or be dispensed into by the spout in any way. Preferably, the food storage component is a pouch as described above which engages with the spout in the manner described above with relation to the pouch of the present invention. However, it should be noted that this pouch, although preferred, need not be provided with the present invention.

Figure 2:
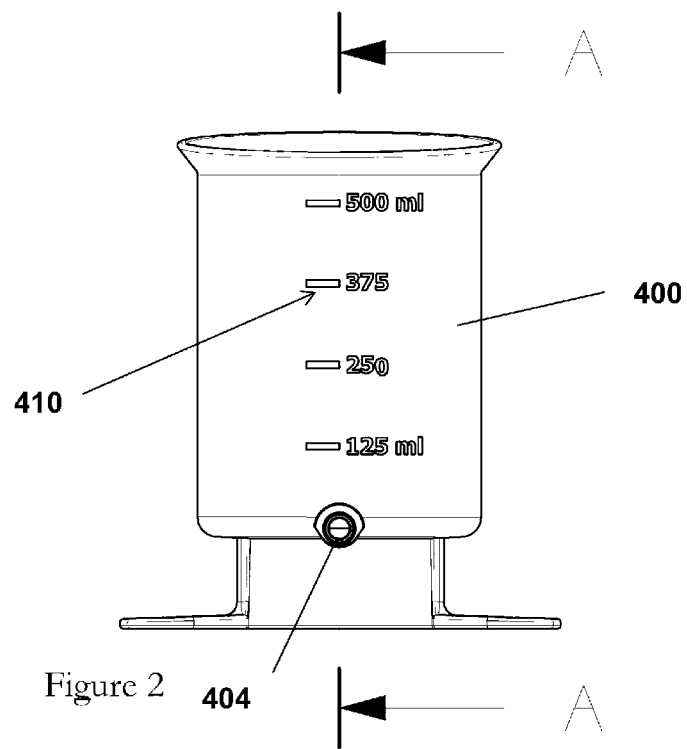
FIG. 2 shows a frontal view of a food dispenser of the present invention.
Figure 3:
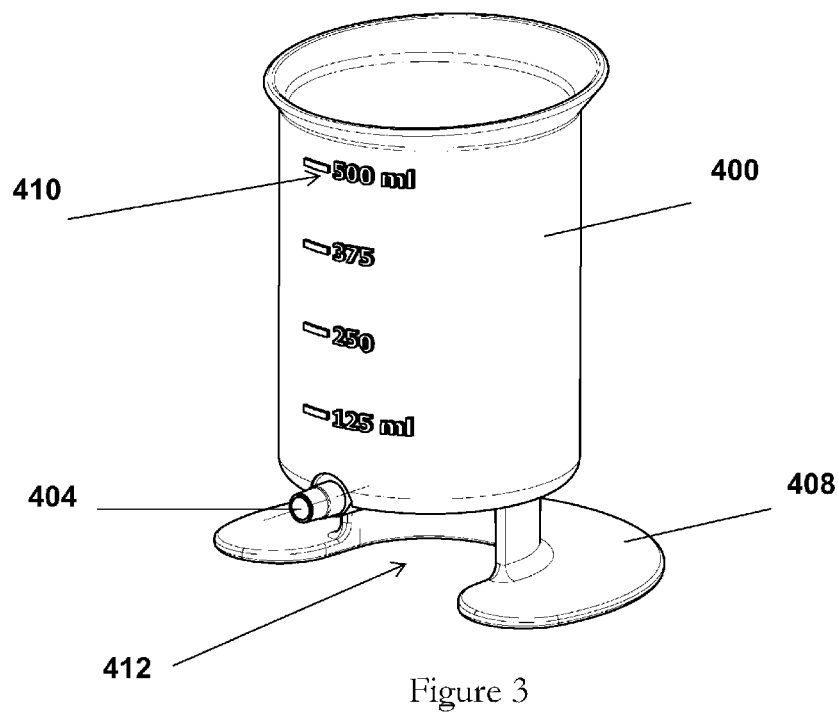
FIG. 3 shows a front perspective view of the food dispenser shown in FIG. 2.
Figure 4:
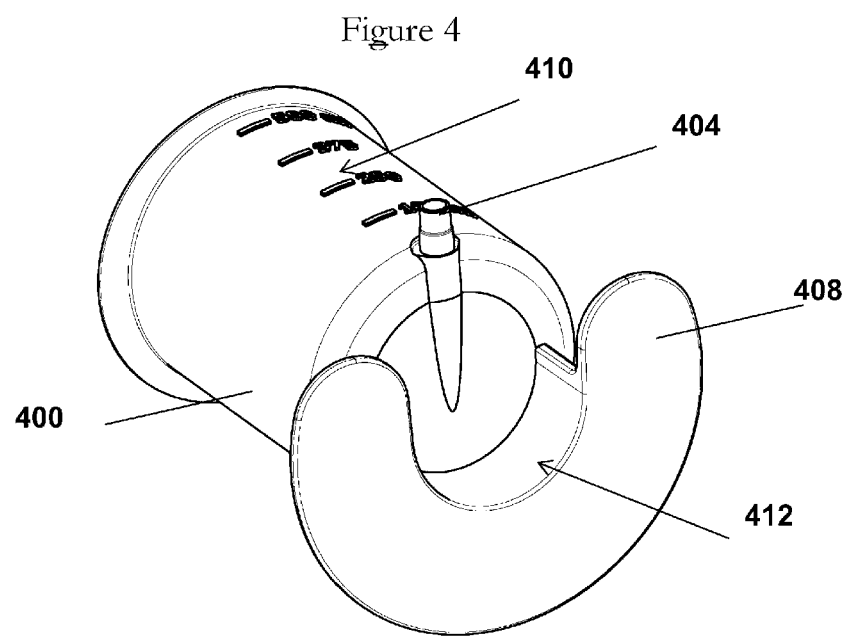
FIG. 4 shows an underside perspective view of the food dispenser shown in FIG. 2.

Turning to FIG. 2, the hopper 400 is preferably a substantially cylindrical, hollow vessel which may comprise polypropylene or other engineering plastic, or may be any other material suitable for food use. The hopper preferably has a capacity of 500 ml, an advantage of this being that it holds approximately four portions of food puree, of a size suitable for babies (125 ml). This is a convenient number of portions for carers to produce at one time. It will be appreciated that smaller or larger portion sizes could also be dispensed according to the age and appetite of the baby or child being fed. Alternatively the hopper may have a greater or smaller capacity, for example for industrial use, use in nurseries, travel use, or the like. An advantage of the hopper having a cylindrical shape is that it can be cleaned easily and does not have any crevices into which food can become stuck. The hopper is preferably open at the top, an advantage of this being that food can easily be inserted therein. A further advantage is that the plunger head can be completely removed for easy cleaning, drying, and maintenance of both hopper and plunger. Alternatively a full or partial cover may be provided.

Figures 5, 6:
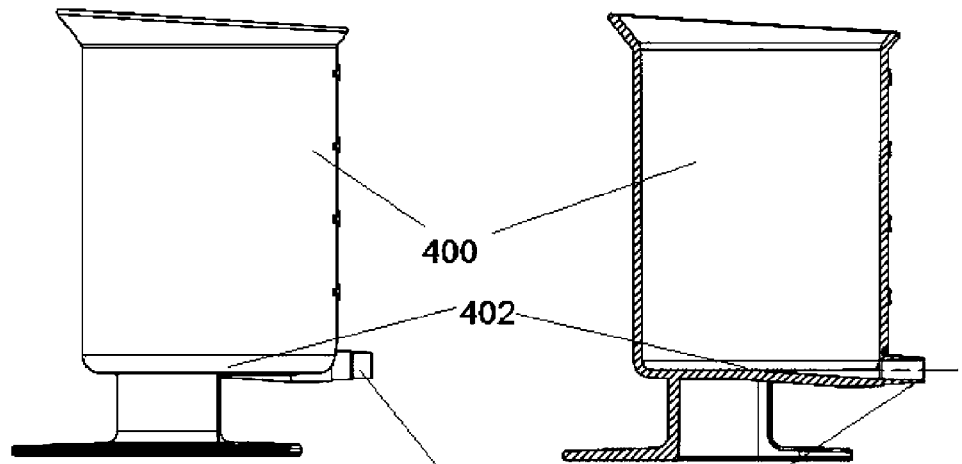
FIG. 5 shows a side view of the food dispenser shown in FIG. 2.
FIG. 6 shows a cross-sectional view of the food dispenser shown in FIG. 2.
Figures 7, 8, 9:
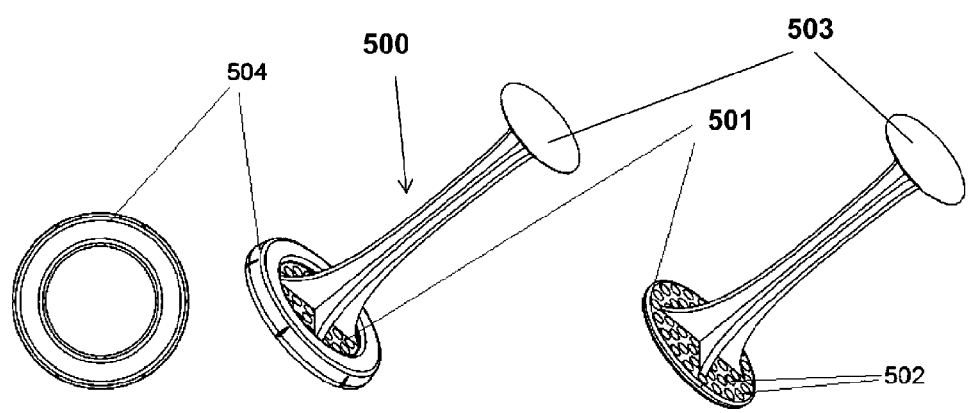
FIG. 7 shows an underside view of a plunger cover of the present invention.
FIG. 8 shows a perspective view of a plunger, including the cover shown in FIG. 9, of the present invention.
FIG. 9 shows a perspective view of the plunger shown in FIG. 8, with the cover shown in FIG. 9 removed.

In the embodiment of FIGS. 2-6, the hopper 400 comprises a substantially flat base 402 as shown in FIG. 6. An advantage of this is that there is a minimal amount of deadspace (that is, space from which food cannot be pushed out by a plunger) in the base 402 of the hopper 400, and maximum food can be pushed out therefrom with a flat plunger 500. Furthermore, the flat base 402 facilitates mashing in the hopper 400 with a substantially flat mashing device. Any mashing device may be used although a mashing device specifically for use with the present invention is described below.

Alternatively, the hopper and hopper base may comprise other shapes known in the art.

A volume measuring scale 410 is provided on the hopper, which ranges from 100 ml to 500 ml in at least 100 ml gradients, although different gradients and a different range may be provided.

The plunger 500 is the shape of a standard plunger as known in the art, comprising a head 501 which spans substantially the entire cross section of the hopper 400, and may comprise an edging around the head 501, comprising silicone, rubber, or the like, which forms a watertight seal with the edge of the hopper to ensure that all puree or the like is pushed down the length of the hopper when the plunger is depressed. It should be noted that tilting such a plunger sideways slightly releases air and therefore aids removal of the plunger from the hopper.

Preferably, the plunger comprises a profile matching that of the hopper base such that when the plunger is fully depressed, the plunger is touching the base of the hopper at as many points as possible, reducing deadspace. Thus the plunger may be conical, flat, or whatever the shape of the hopper base.

The plunger comprises a head 501, a handle 503 and a removable cover 504 as shown in FIG. 5. An advantage of this is that the cover can be removed and cleaned easily. Most preferably, the head 501 comprises at least one orifice, and preferably a multiplicity of holes 502, slits, or other orifices of any shape such that the head without the cover can be used as a masher to mash food within the hopper. Furthermore the head may comprise any arrangement able to mash food, for example a series of curved or zig-zagged strips of metal or plastic, or any mashing arrangement known in the art. An advantage of this is that the plunger can be used to mash food in the hopper which will be fast and efficient since the plunger closely fits the shape of the hopper. Most preferably, the overall shape of the plunger head matches that of the hopper base such that when the plunger is fully depressed, without the cover, the plunger head is touching the base of the hopper at as many points as possible, an advantage of this being that mashing can take place within the greatest possible volume of the hopper.

The cover may be silicone or other material and is preferably of a washable material, and is replaced on the plunger head to enable the plunger to be used as a plunger without mashing. The cover may snap, screw, slot, push-fit or otherwise engage with the head to cover the head in any way known in the art. An advantage of the plunger cover is that its flat shape and watertight seal with the sides of the hopper enable efficient plunging of all food inside the hopper with minimal waste. Furthermore, it enables a single device to be used both for plunging and mashing, reducing costs and cleaning. An advantage of the head being manufactured entirely from silicone is that it forms a watertight seal with the sides of the hopper which is less likely to accidentally come off during downward plunging compared with having a silicone edging to the plunger.

Both the head and the cover may or may not comprise an edging of silicone, rubber, or the like, which forms a watertight seal with the edge of the hopper to ensure that all puree or the like is pushed down the length of the hopper when the plunger is depressed.

The plunger handle 503 may be any handle as known in the art and enables a user to push down the plunger to eject food from the spout. Preferably, the hopper is designed such that puffing upwards on the plunger handle sucks the food towards the plunger head. An advantage of this is that it will enable food to be removed from a pouch, for example in the case of overfilling.

The spout 404 is a regular spout as known in the art, being a hollow, substantially narrow component guiding the flow of food by allowing it to flow therein from the hopper and exit therefrom. The spout 404 has a circular cross section as known in the art, although it may have other shapes, and comprises an inlet at a junction with the hopper, with an outlet at its end furthest from the hopper to allow food to exit therefrom. The spout may be connected at any point to the hopper.

The spout 404 is connected to the side of the hopper 400 and gradually merges with the hopper as shown in FIG. 6. It will be readily appreciated from the figures that the spout 404 is joined to the hopper 400 with a larger opening than the axial cross-section of the spout. That is, the join is an area across a diagonal cross section of the spout. An advantage of this is that a larger part of the spout can be accessed for cleaning or removing blockages, and furthermore deadspace in the spout is reduced. Furthermore less material is used to create the spout, making it cheaper to produce.

Preferably, the dispenser 400 further comprises at least one foot 408 to add stability thereto. The at least one foot may be any shape known in the art, and may comprise feet of the same or different shapes. Preferably, the device comprises one foot 408 which is substantially C-shaped as shown in the figures, and thereby provides a gap 412 substantially below the spout. An advantage of this is that the pouch or food storage component can be easily emplaced in front of the device for filling, without any interference from the foot. A further advantage is that, in the case of spillage or due to drips or leaks, the foot is not beneath the spout and will not become soiled. A further advantage is that a user can place a hand under the pouch for support, removal or the like without interference from the foot. It will be readily understood that the foot may comprise many other shapes providing a gap beneath the spout. C-shaped is the preferred shape since it is flat, stable, and easy to clean.

Figure 10:
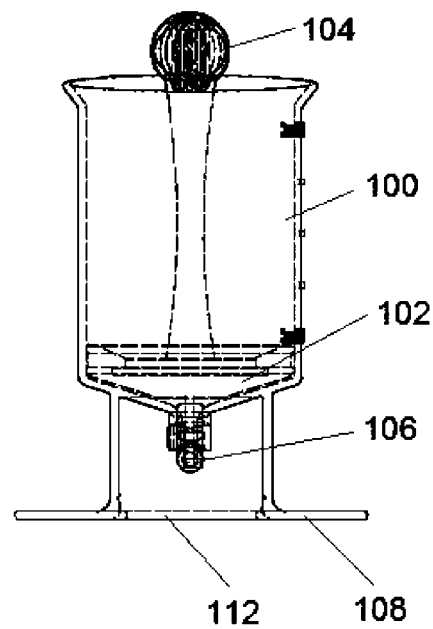
FIG. 10 shows a frontal view of an alternative food dispenser of the present invention with an alternative plunger inserted therein.
Figure 11:
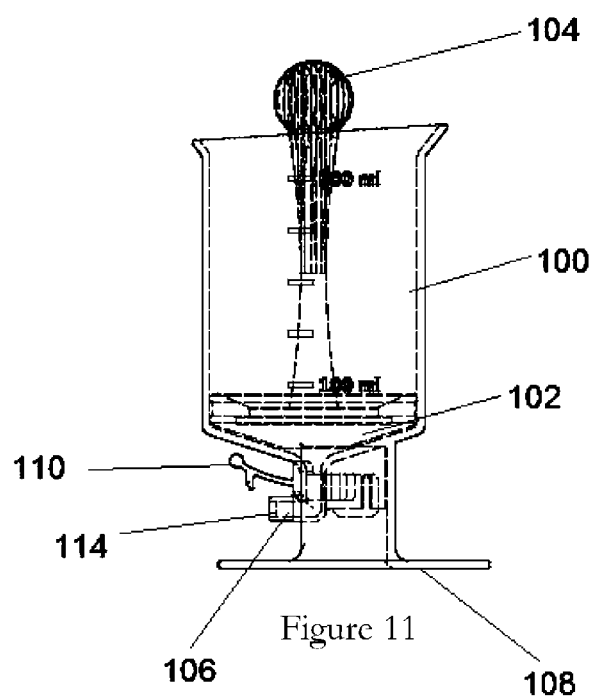
FIG. 11 shows a side view of the food dispenser and plunger shown in FIG. 10.

In an alternative embodiment shown in FIGS. 10 and 11, the hopper 100 is transparent and comprises a tapered base 102 such that gravity will assist food towards the bottom and centre of the hopper. Having a hopper with a tapered base, the spout 106 is connected to the hopper 100 at the bottom centre of the hopper such that the spout and hopper base together form a T shape. An advantage of this is that gravity assists the food out of the hopper and into the spout. The spout 106 is joined over a circular cross section with the hopper.

A cap may be provided to cover the spout. An advantage of this is that it helps prevent food from exiting the spout during mashing. Food in the hopper can therefore be mashed or pureed with the masher of the present invention or other mashing or pureeing device, simplifying the process and reducing washing up. The cap may be any device able to cover the spout and prevent food from exiting therefrom, and may snap, screw, slot, push-fit or otherwise engage with the spout on the inside or outside thereof.

The device comprises a foot 108 which is substantially C-shaped, and thereby provides a gap 112 substantially below the spout.

The system further comprises a latch 110. The latch substantially maintains the position of the food storage component or pouch with respect to the spout, during filling. Preferably, the latch 110 cooperates with a protrusion 208 on said food storage component or said pouch 200 to maintain the position. The latch may have a substantially flat surface which contacts the protrusion and fits behind the protrusion, or may have a concavely curved surface which contacts the protrusion and at least partially surround the nozzle, behind the protrusion (where 'behind' is defined as being on the side of the protrusion furthest from the dispenser).

In the preferred embodiment, the latch is a manual latch. This is advantageous due to its simplicity of design. The latch comprises a lever pivotally connected to the dispenser such that the end of the latch furthest from the hinge can be manually moved up and down to engage with or disengage from the pouch. The hinge may be disposed in any location which facilitates this engagement and disengagement, although preferably the hinge is disposed substantially beneath the hopper, an advantage of this being that it is out of sight and does not interfere with the smooth, clean cylindrical appearance of the dispenser. The end of the latch furthest from the hinge (the engaging end) is preferably shaped as shown in the figure although it may comprise any shape able to engage with the pouch or food storage component, and may for example be designed to fit into an indentation or cooperate with a protrusion on the pouch or food storage component, or to fit at least partially around the neck of the pouch or food storage component. Preferably the pouch or food storage component comprises a protrusion and the engaging end is designed to fit behind this protrusion, that is, on the side of the protrusion furthest from the hopper, and thereby prevent movement of the pouch or food storage component during filling. Furthermore, the neck of the pouch or food storage component may comprise a protrusion as described with relation to the pouch below, and the engaging end may be designed to at least partially surround this protrusion.

In an alternative embodiment, the latch may be an automatic latch. The latch may be sprung or otherwise arranged mechanically or electrically, or in any way such that the insertion of the pouch causes the latch to self-engage, in any way known in the art.

The latch may be removable for ease of cleaning, by any mechanism known in the art. Furthermore, the latch may be any device which, when engaged, substantially maintains the position of the pouch or food storage component, with respect to the dispenser, and when disengaged enables insertion and removal of a pouch or food storage component. Still further, there may be no latch. Advantages of having no latch are ease of cleaning and reduced production cost.

Preferably the system further comprises a valve 114 to prevent egression of food when the plunger is stationary. The valve is preferably a silicone valve as known in the art, although other valves may be used. Furthermore preferably the valve is a two way valve such that, when the plunger is pushed down, food can exit the hopper and enter the spout, and when the plunger is lifted up, the valve allows suction to cause food to rise up the spout and into the hopper. This is advantageous in the case of overfilling of pouches as aforementioned. Alternatively the valve may be a one-way valve.

The valve is preferably disposed at the base of the hopper, where the spout joins the hopper, an advantage of this being that gravity assists the flow of food through the valve. Alternatively the valve may be wherever food exits the hopper, or anywhere in the spout.

The valve preferably comprises a two-way silicone valve as known in the art, or may alternatively comprise any other type of one-way or two-way valve known in the art.

The present invention is fully adapted for use at home or in a childcare setting. The fully openable lid enables filling by hand from pots, pans or the like easily. The mechanical design reduces the cost compared with electrical food pumps and the like. The clean lines of the design mean that the dispenser can be cleaned effectively by passing hot water through the dispenser without the need for specialist cleaning equipment or dismantling. The dispenser is preferably of a size adapted for use and storage in a conventional home kitchen and with regular sized pots and pans and the like. The foot and latch facilitate manual filling. The latch is hand operated and the foot leaves adequate room for a hand to hold a pouch or other food storage component during filling and not to become soiled during filling.

Furthermore the provision of a pouch adapted to cooperate with the dispenser enables easy engagement of pouches by hand and facilitates the use of convenient portion sizes which can be made at home, with minimal waste or mess due to the preferred latch engagement mechanisms.

The invention claimed is:

1. A food dispensing system comprising: a hopper circumscribing an axis; a masher having a handle, a head and a removable cover for the head such that, with the cover on the head, the masher may be used as a plunger; and a spout extending perpendicular to the axis and connected to a side of the hopper gradually merging with the hopper in an area across a diagonal cross section of the spout wherein a larger part of the spout is accessed for cleaning and removing blockages; wherein said spout is adapted to cooperate with an opening of a food storage component, the food storage component having an opening with a nozzle at said opening.

2. The food dispensing system of claim 1 further comprising: at least one pouch comprising: a sachet having an opening; a nozzle at said opening; and a removable lid; wherein said spout is adapted to cooperate with said opening.

3. The food dispensing system of claim 1 further comprising a latch wherein said latch substantially maintains the position of said food storage component or said pouch with respect to said spout.

4. The food dispensing system of claim 3 wherein said latch fits behind a protrusion on said food storage component or said pouch to maintain the position.

5. The food dispensing system of claim 3 wherein said latch at least partially surrounds a protrusion on said food storage component or said pouch to maintain the position.

6. The food dispensing system of claim 3 wherein said latch comprises a manual latch.

7. The food dispensing system of claim 3 wherein said latch comprises an automatic latch.

8. The food dispensing system of claim 1 wherein said dispenser further comprises at least one foot for providing stability.

9. The food dispensing system of claim 8 wherein said foot provides a gap substantially below the spout.

10. The food dispensing system of claim 8 wherein said foot is substantially C-shaped.

11. The food dispensing system of claim 1 further comprising a valve to prevent egression of food when the plunger is stationary.

12. The food dispensing system of claim 1 further comprising a cap for covering said spout.

13. The food dispensing system of claim 1, wherein the head comprises at least one orifice.

14. The food dispensing system of claim 13, wherein the head comprises a multiplicity of orifices.

15. A method of dispensing food, comprising: providing the system of claim 1; placing food within the hopper; mashing the food within the hopper with the masher; covering the head of the masher with the cover to form a plunger; and plunging the plunger within the hopper to dispense food, via the spout, into a food storage component, the food storage component having an opening with a nozzle at said opening.

* * * * *